United States Patent [19]

Balko et al.

[11] 4,371,433
[45] Feb. 1, 1983

[54] APPARATUS FOR REDUCTION OF SHUNT CURRENT IN BIPOLAR ELECTROCHEMICAL CELL ASSEMBLIES

[75] Inventors: Edward N. Balko, Wilmington, Mass.; Lawrence C. Moulthrop, Stratham, N.H.

[73] Assignee: General Electric Company, Wilmington, Mass.

[21] Appl. No.: 195,920

[22] Filed: Oct. 14, 1980

[51] Int. Cl.³ .................. C25B 15/06; C25B 15/08; C25B 9/00; H01M 8/24
[52] U.S. Cl. .................. 204/228; 204/255; 204/279; 429/18
[58] Field of Search .................. 204/253–258, 204/228, 128, 279; 429/18

[56] References Cited

U.S. PATENT DOCUMENTS

| | | | |
|---|---|---|---|
| 1,199,472 | 9/1916 | Levin | 204/256 |
| 1,508,758 | 9/1924 | Allan | 204/256 |
| 2,717,872 | 9/1955 | Zdansky | 204/258 X |
| 4,197,169 | 4/1980 | Zahn et al. | 204/228 X |
| 4,247,376 | 1/1981 | Dempsey et al. | 204/258 X |

FOREIGN PATENT DOCUMENTS 141463  5/1980  Fed. Rep. of Germany ...... 204/255

Primary Examiner—Donald R. Valentine
Attorney, Agent, or Firm—I. David Blumenfeld

[57] ABSTRACT

Shunt currents which flow between the electrodes of adjacent cells through the moving conductive fluid and the fluid pool in the manifold of a bipolar cell assembly are minimized by introducing the conductive fluid at the top of an elongated outlet manifold. This results in cascaded flow which interrupts the current path. Shunt currents between the fluid manifold walls of the conductive bipolar elements in the series connected electrochemical cell assemblies are minimized by insulating the manifold walls with insulating, elastomeric sealing grommets. This prevents current flow between the manifold walls through the electrically conductive fluid in the manifold and provides an edgeseal between bipolar plates.

5 Claims, 5 Drawing Figures

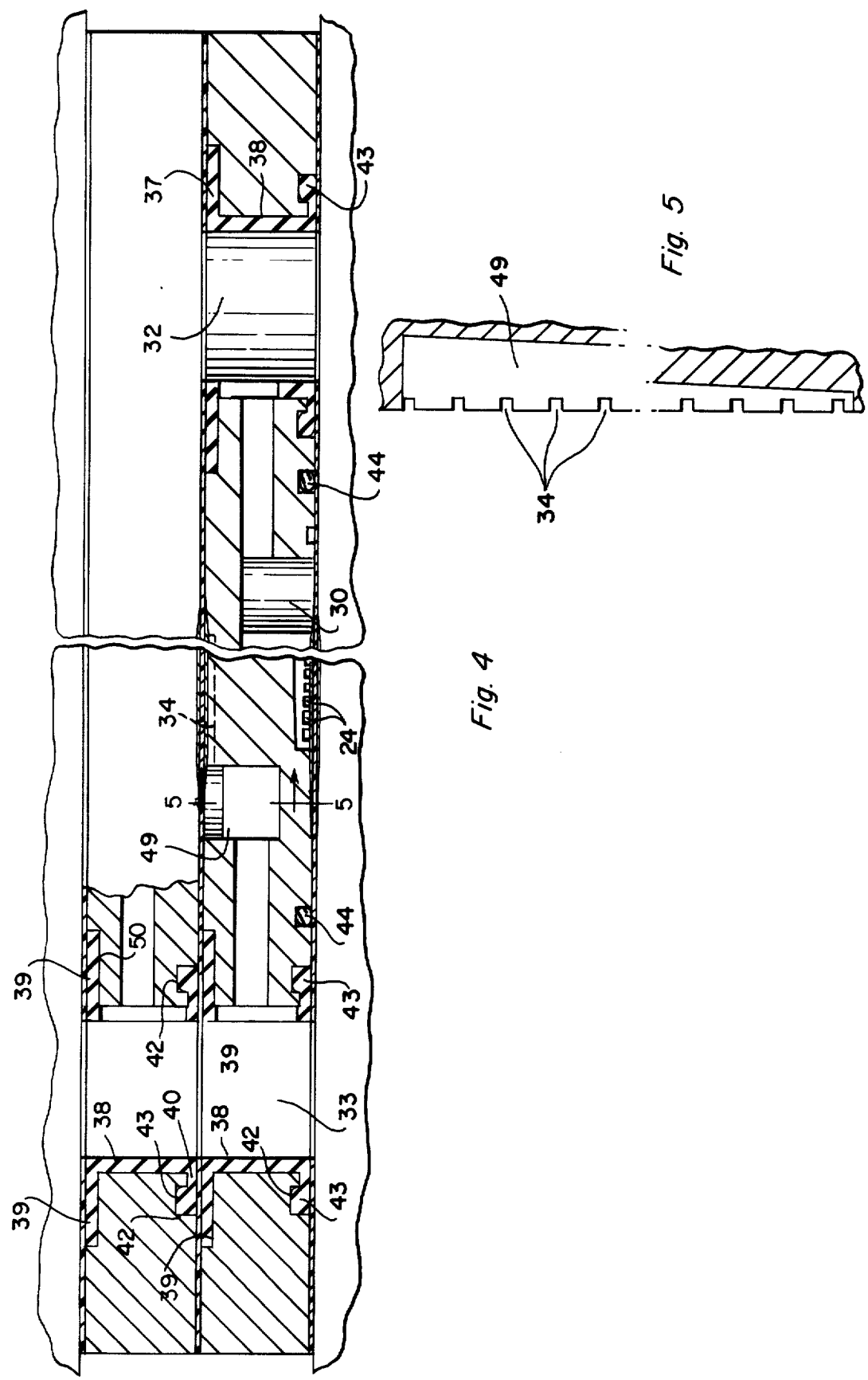

APPARATUS FOR REDUCTION OF SHUNT CURRENT IN BIPOLAR ELECTROCHEMICAL CELL ASSEMBLIES

The instant invention relates to a process and apparatus for electrochemical cell assemblies and more particularly, for reducing shunt current in series connected bipolar assemblies.

While the instant invention will be described specifically in connection with a chlorine electrolyzer cell assembly, the invention is by no means limited thereto and may be utilized with any electrochemical system which utilizes a conductive fluid. For example, it is applicable to fuel cell batteries utilizing a plurality of conductive bipolar elements between fuel cells which utilize conductive halogen/hydrogen feed stocks.

Construction of an electrolyzer as a cell stack operating in an electrical series arrangement and comprising a plurality of bipolar elements separated by ion transporting membranes having electrodes bonded to opposite surfaces thereof offers a number of advantages in terms of efficient space and material utilization and permits fluid manifolding to be an integral part of the bipolar plates.

If the fluid (such as an aqueous solution of HCl or brine, for example), is itself a good electrical conductor it is possible for a fraction of the electrical current applied to the stack to follow a path through the fluid in the manifold rather than through the electrolytic cells. These currents are usually called "shunt currents" and are parasitic since they are not used in the cell reactions and obviously cause the electrolyzer assembly to be less efficient.

When the individual bipolar cell elements are fabricated from an electrically conductive material such as graphite, the interior wall of each manifold is exposed to the conducting fluid. In a series connected bipolar assembly, voltage differences exist between individual cells and these differences may be 2 or 3 volts per cell. Although the periphery of the major faces of the conductive bipolar elements are separated by the thickness of an insulating film or a gasket, the conductive interior walls of the manifold are exposed to the fluid and large shunt currents can flow between the interior manifold walls of adjacent cell through the conductive fluid in the common manifold.

Another source of a parasitic shunt current that exists in a bipolar series connected cell assembly is current flow between the conductive electrodes bonded to the membranes of adjacent cells through the moving fluid streams in contact with the electrodes which pass into a manifold and into the pool of conductive fluid in the common manifold. Such currents perform no useful function in the electrochemical cell and are therefore a parasitic current which reduces the efficiency of the electrolyzer or other electrochemical assembly.

Applicant has discovered a method and means for minimizing both sources of the parasitic shunt currents. First, by insulating the manifold walls of the individual bipolar elements by means of an elastomeric, insulating and sealing grommet to form an insulated pipe down the length of the manifold, and secondly by bringing the conductive liquid out of each of the cells into the top of an elongated manifold to provide cascaded, gravitational flow which interrupts the flow path so that this shunt current is minimized. It is therefore a primary objective of this invention to provide a method and apparatus for minimizing shunt current flow in series connected, bipolar electrochemical cell assemblies.

Another objective of the invention is to provide a method and apparatus for minimizing shunt current flow in a bipolar cell stack which utilizes common manifolding for conductive fluids.

Still another objective of the invention is to minimize shunt current flow in a filter press, bipolar cell assembly by insulating the fluid manifold walls from the fluid.

Yet another objective of the invention is to minimize shunt current flow in a bipolar series connected cell assembly by providing interrupted flow paths for a conductive fluid into the fluid outlet manifold.

Other objectives and advantages of the instant invention will be become apparent as the description thereof proceeds.

The various advantages and objectives of the invention are achieved in a series connected multicell assembly utilizing conductive graphite bipolar plates which incorporate outlet manifolds for the conductive fluids directly in the bipolar plate. The manifolds are elongated and lined with an insulating elastomeric grommet to eliminate conduction of current flow between the conductive flow in the manifold. In addition, shunt currents between adjacent cell electrodes through the flowing conductive fluids are minimized by introducing the conductive fluid (anolyte or catholyte) at the bottom of the bipolar plates so that they flow upwards through the cell. The excess fluid is introduced into the top of the outlet manifold so that it cascades into a pool of the conductive liquid at the bottom of the manifold. The cascade flow interrupts the flow path of the conductive fluid sufficiently raising the resistance of the path sufficiently to minimize shunt current flow between the conductive electrodes of various cells.

The novel features which are believed to be characteristic of this invention are set forth with particularity in the appended claims. The invention itself, however, together with further objects and advantages thereof, may best be understood by reference to the following description taken in connection with the accompanying drawings in which:

FIG. 4 is a sectional view taken along lines 4—4 of FIG. 3.

FIG. 5 is a sectional view along lines 5—5 of FIG. 4.

Figures 1, 3:
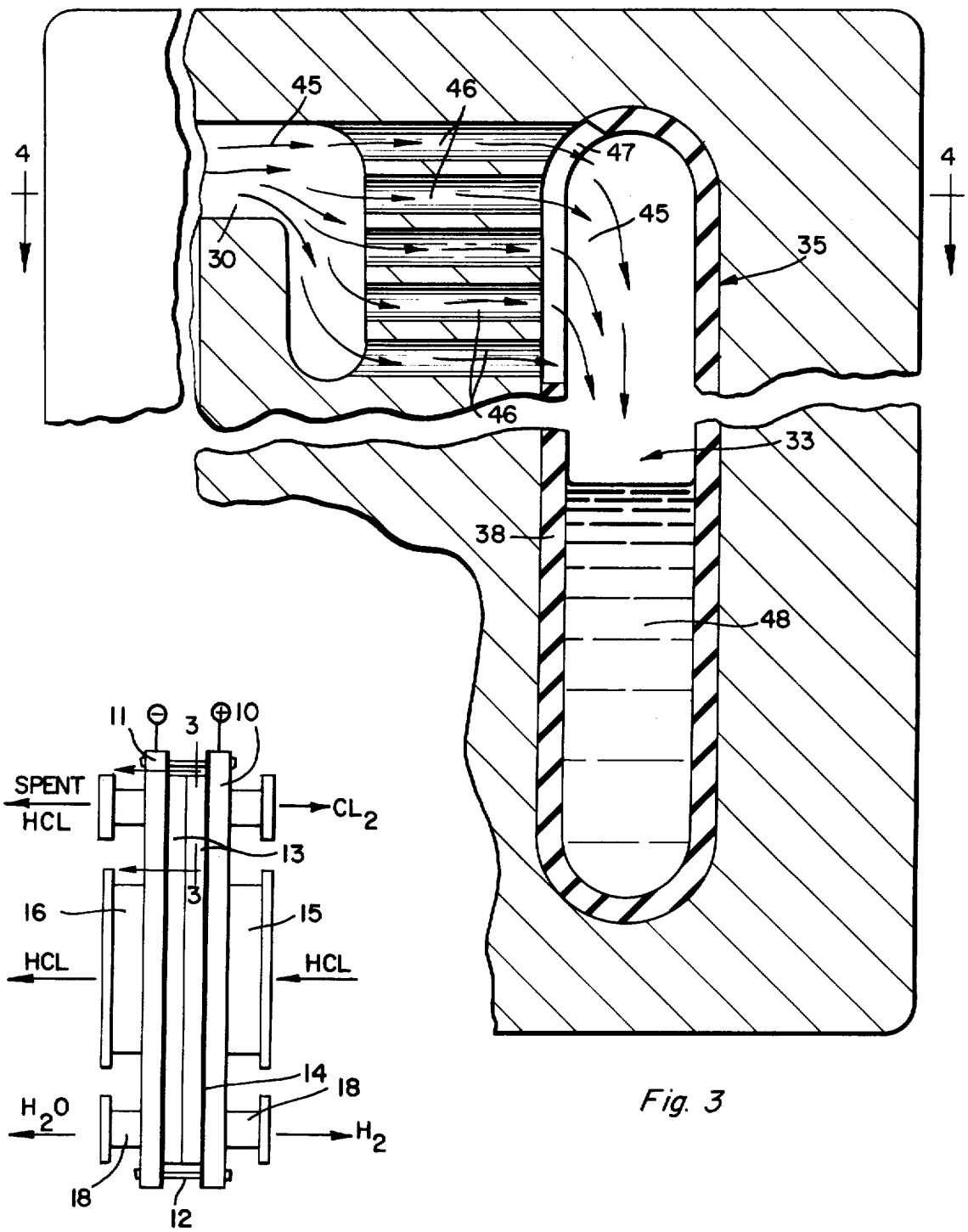
FIG. 1 is a plane view of an assembled multicell bipolar electrolyzer stack.
FIG. 3 is a partial sectional view taken along lines 3—3 of FIG. 1 and illustrates the manifold and grommet assembly and the manner in which conductive fluids from the cell are brought into the manifold.

FIG. 1 illustrates a multicell bipolar HCl electrolyzer assembly which consists of conductive anode and cathode endplates 10 and 11 clamped together by suitable bolts or tie rods 12. Endplates 10 and 11 are respectively connected to the positive and negative terminals of a power source. Positioned between the endplates are a plurality of bipolar elements 13 separated by ion transporting membranes 14; to be described in greater detail in connection with FIG. 2. Catalytic anode and cathode electrodes are bonded to opposite sides of membranes 14. Conductive projections on opposite sides of the bipolar elements contact the electrodes bonded to the major surfaces of an adjacent pair of membranes. The anolyte feed stock is brought into the electrolyzer through an inlet conduit 15 and excess feed stock is removed through an outlet conduit 16. Outlet conduit pairs 17 and 18 communicate respectively with the inlet and outlet manifolds of the bipolar elements to remove the electrolysis products from the anode and cathode chambers of each cell as well as depleted anolyte and catholyte. The outlet conduit pairs respectively remove the gaseous electrolysis products and the fluid.

Figure 2:
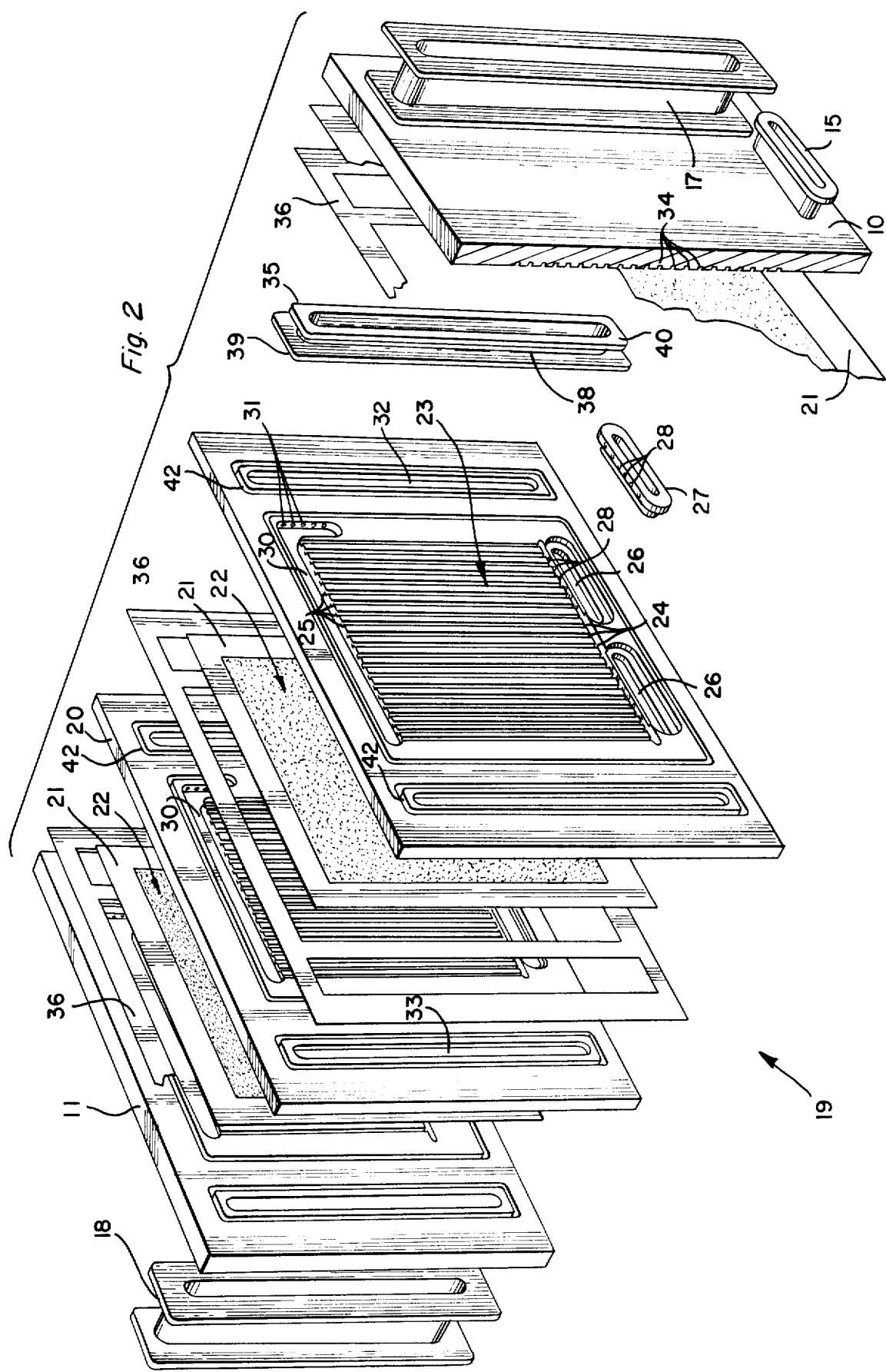
FIG. 2 is an exploded view of a four cell bipolar stack.

FIG. 2 shows a partially exploded view of a four cell bipolar electrolyzer 19 in which shunt currents are minimized. Electrolyzer 19 consists of a plurality of conductive bipolar elements 20, and a plurality of cation transporting membranes 21 positioned between anode and cathode endplates 10 and 11. An anode electrode 22 is bonded to the central portion of membranes 21 and corresponding cathode electrodes, not shown, are bonded to the other side of each membrane. The conductive, bipolar current collecting and fluid distributing elements 20 contact the anode electrode 22 of one membrane and the cathode electrode, not shown, of the adjacent membrane to form a plurality of series connected cells in which the electrochemical reactions, (electrolysis, fuel cell power conversion, etc.) take place.

Each conductive, bipolar, element 20 include a central chamber 23 containing a plurality of parallel, conductive electrode contacting projections 24. The parallel projections also define fluid conducting channels 25 through which the conductive fluids, as well as the electrolysis products, in the case of an electrolyzer, are transported. The conductive anolyte, such as an aqueous solution of HCl is introduced into the central chamber through inlet manifolds 26 which are lined by insulating liners 27. Insulating liners 27 and inlet manifolds 26 include a plurality of passages 28 which communicate between the inlet manifolds and central chamber 23. The anolyte and evolved chlorine pass through fluid distribution channels 25 to anode collecting channel 30 at the top of the central chamber. Channel 30 communicates through opening 31 to a anolyte outlet manifold 32. A similar outlet manifold chamber 33 is provided on the other side of the bipolar collector which communicates with the fluid distribution channels on the other side of the bipolar element, not shown. The current conducting projections on the other side of the bipolar elements are oriented at right angles on the anode contacting side, and are similar to those which may be seen in cathode endplate 11 which shows a plurality of horizontal fluid channels 34.

Manifolds 32 and 33 of the various bipolar collector elements are, in accordance with one aspect of this invention, insulated by means of the elastomeric, insulating grommets 35 to minimize shunt current flow between the conductive manifold walls of adjacent bipolar units. As pointed out previously, in a filter press assembly the electrodes (anode and cathode) of the series connected bipolar cells, are at different potentials, with the electrodes of the cells closest to the anode endplate being at a higher potential than those of cells closer to the cathode endplate. As a result, current can flow between the conductive manifold walls of adjacent cells through the conductive fluid at the bottom of the outlet manifolds. The insulating grommets line the manifold walls and interpose a non-conductive barrier between the fluid and the conductive walls.

A thin, preferably 5 mil or less insulating film 36 is attached to one face of each bipolar plate to prevent a short circuit between the conductive plates. The film is preferably a fluorocarbon polymer such as polytetra fluoroethylene of the type sold by DuPont under the trade designation TEFLON or polyvinilidene fluoride sold under the trade designation KYNAR. Insulating film 36 is fastened to the face of the bipolar element by a suitable adhesive. One form of such suitable adhesive is a polyvinilidene adhesive sold under the trade designation TEMPER-TAPE by the Howard Rubber Company of Bridgeport, CT.

The elastomeric manifold sealing grommets 35 are preferably fabricated of any suitable insulating material which is capable of withstanding the environment in a particular system. Thus in an HCl chlorine electrolyzer the grommet may be fabricated of a fluorocarbon material or any other material which is resistant to HCl and to the evolved chlorine. One example of such a material is an elastomeric fluorocarbon such as polyhexafluoroprophlene rubber which is sold by the DuPont Company under its trade name VITON. For a chlorine and HCl resistant formulation, VITON having a Parker Compound No. V 834-70 is preferred.

Grommet 35 consists of a body 38 which lines the interior walls of the manifolds and flanges 39 and 40 which form an edge sealing arrangement when the bipolar cells are assembled. Sealing flange 40 includes a sealing bead or lip, not shown, on its underside which fits into sealing groove 42 in the bipolar element. As will be described in greater detail later, the sealing bead fits into the groove and is retained in the groove by flange 39 of the adjacent grommet. The two flanges seal against each other to prevent conductive fluid and gasous electrolysis products from escaping between the bipolar plates.

As may be seen most clearly in FIG. 4, when assembled the walls of manifolds 32 are lined by grommet body 38. The sealing flange 40 of the of the grommet includes a sealing bead or lip 43 which fits into groove 42 on the side of the bipolar element which contacts the cathode electrode. Flange 39 of the grommet lining the manifold of the adjacent cell is seated in notch 50 in the bipolar plate and bears against flange 40 and compresses that flange and sealing bead 43 to form an edge seal between adjacent bipolar plates thereby preventing gas and fluid leakage. Also positioned on the side of the bipolar plates contacting the cathode of electrodes of each of the cells are o-ring seals 44 which are seated in o-ring grooves in the bipolar element. The combination of insulating film 37, o-ring seals 44 and insulating flanges 35 and 40 insure that there is no direct contact between the faces of the bipolar elements. The grommets when assembled thus form an insulating pipe down the manifold thereby eliminating shunt currents between the conductive manifold walls of adjacent bipolar elements.

FIG. 3 illustrates the manner in which shunt currents which may flow between the conductive electrodes of adjacent cells through the flowing fluid and the conductive fluid pool at the bottom outlet manifold are minimized. This aspect of the invention will be described in connection with the anolyte outlet manifold of an electrolyzer. It will however be clear to the man skilled in the art, that it applies with equal force to the catholyte outlet manifold of any electrochemical cell assembly utilizing conductive fluids and conductive bipolar elements.

To this end, the depleted conductive anolyte fluid 45 and chlorine from the anode chamber of each cell passes into collection channel 30 and through passages 46 in the bipolar plates and openings 47 in grommet 35 to the top of the anolyte outlet manifold. Fluid stream 45 thus cascades from the top of the manifold into the fluid pool 48 at the bottom of the manifold. By forcing the conductive fluid to fall from the top of the manifold vertically into the pool, the conductive current path of the fluid is at least interrupted thereby increasing the resistance of the path of the fluid sufficiently to minimize shunt current flow from the anode of one cell through fluid stream 45 and pool 48 to the fluid stream 45 of an adjacent cell.

FIG. 5 illustrates the variable depth collection channel 49 on the cathode side of each bipolar collector. Channel 49 communicates with the fluid distributing channels 34 on the cathode side of the bipolar collector and communicates through the opening 31 shown in FIG. 1, with the cathode side outlet manifold 33. The depth of the channel increases towards the manifold so that the volume of the collection channel increases to accomodate all the fluid flowing toward the exit manifold.

The conductive bipolar current collector, fluid distributing elements 20 are, in the case of a HCl electrolysis system, preferably a bonded aggregate of graphite and fluorocarbon polymeric particles. The fluorocarbon particles may be of any sort although polyvinilidene fluoride polymers such as those sold by the Pennwalt Corporation under the tradename KYNAR are preferred. In the instance of the chlorine electrolyzer utilizing aqueous solution of hydrochloric acid as the anolyte a conductive molded graphite plate has been described as the preferred embodiment. However, the invention is by no means limited thereto and is equally applicable to any conductive bipolar element.

The ion transporting membranes 21 to which electrodes are physically bonded are preferably perfluorosulfonic acid cation transporting membranes of the type sold by the DuPont Company under its trade designation Nafion. These membranes allow transport of hydrogen cations, in the case of a HCl system, from the anode to the anode chamber where they are discharged at the cathode electrode to form hydrogen while chlorine is generated in the anode chamber. The electrodes 22 which are bonded to the major surfaces of the membranes are in the case of the anode electrode preferably a bonded mixture of the oxides of a platinum group metal such as platinum, iridium, ruthenium, etc. with a fluorocarbon particles such as polytetrafluoroethylene as sold under the trade name TEFLON. The electrodes are gas and liquid permeable, electroconductive, and catalytically active to evolve chlorine from the anolyte. The precise manner in which these electrodes are fabricated, their preferred constituents, and the manner in which the membrane and bonded electrode system are fabricated are explained in detail in U.S. Pat. No. 4,224,121 issued Sept. 23, 1980 and assigned to the assignee of the present invention. The above identified patent is hereby specifically incorporated by reference for a complete and detailed showing of the details of the membrane, the electrode, the manner of fabricating the electrode and the manner of applying the same of the membrane.

While any number of manifold geometries will serve to remove fluid, a geometry which has a form factor such that the vertical axis is substantially greater than the horizontal axis, and introducing the conductive fluid at the top of the manifold is the preferred approach. By making the vertical height of the grommet and the manifold greater than its width, and by removing fluid from the bottom of the manifold at a rate sufficient to insure that the manifold is partially empty of fluid, cascade flow of the fluid into the manifold fluid pool occurs thus interrupting the fluid path, increasing its resistance thereby minimizing the shunt current. This aspect of the invention, the reduction of the shunt current by use of an internal cascade to cause fluid discontinuity and increase path length is applicable to any electrolyzer or electrochemical cell system which employs a conductive fluid, independent of insulating or conductive nature of the manifold walls or cell plates.

Grommet shapes and manifold shapes approaching squares or circles can also achieve the effect depending on the size and diameter of the device but such manifolds must be very large to permit a sufficient cascade height. This would not be an efficient use of space and material and for this reason the above described elongated shapes are the preferred embodiment.

Since the excess fluids from the cell are introduced at the top of the outlet manifold to allow cascaded flow, the fluid must pass upwardly through the cell. This requires that the fluids be pressurized. Introducing the fluids at 15-15 psig is more than adequate with the precise pressure range depending on the height of the cell.

It will be apparent from the foregoing that a very effective arrangement has been provided for eliminating shunt current in series connected electrochemical cells which include a plurality of conductive bipolar current conducting elements positioned between ion transporting membranes.

While the instant invention has been shown in connection with the preferred embodiment, the invention is by no means limited thereto, other modifications of the instrumentality employed and the steps of the process may be made and fall within the scope of the invention. It is contemplated by the appended claims to cover any such modifications that fall within the true scope and spirit of this invention.

What we claim as new and desire to secure by Letters Patent of the United States is:

1. An electrochemical cell assembly comprising a plurality of electrochemical cells stacked together in an electrically series connected arrangement, each cell comprising:
   (a) an ion exchange membrane positioned between and in contact with catalytic electrodes,
   (b) a plurality of electrically conductive bipolar plates separating adjacent membranes, each of said plates having a plurality of electrode contacting projections on opposite faces which define a plurality of fluid distributing channels, each bipolar element contacting the electrodes associated with adjacent membranes,
   (c) outlet manifold means in each of the bipolar elements communicating with the fluid distributing channels and aligned with the outlet manifold means in each of the remaining bipolar elements to form a common outlet manifold means for the cell assembly,
   (d) means for introducing a conductive fluid to each cell which passes through the fluid distributing channels and into contact with an electrode, with excess fluid passing out of the cell into the outlet manifold means,
   (e) means for preventing shunt current flow between cells and through the conductive fluid in the the manifolds, comprising elastomeric insulating means having a main body portion lining the manifold walls of each bipolar element, said main body having a pair of flange members extending therefrom and overlapping the flange members of the insulating means mounted on the adjacent bipolar plate to form a fluid-tight seal between adjacent plates and to prevent current flow between conductive manifold walls through the conductive fluid in the common manifold.

2. The electrochemical cell assembly according to claim 1 wherein said manifold means have a longer dimension along one axis than the other.

3. The electrochemical cell assembly according to claim 2 wherein the excess fluid is introduced into the manifold at the top of the manifold axis having the longer dimension.

4. The electrochemical cell assembly according to claim 1 wherein the catalytic electrodes are bonded to opposite faces of each membrane.

5. The electrochemical cell assembly according to claim 1 wherein one of said flange members of each insulating member has a projection extending therefrom which is positioned in a groove means in the conductive bipolar plate.

* * * * *